Aug. 21, 1928.
E. E. BERRY
1,681,388
SELF OILING AND ALIGNING BEARING
Filed April 10, 1924   2 Sheets-Sheet 1
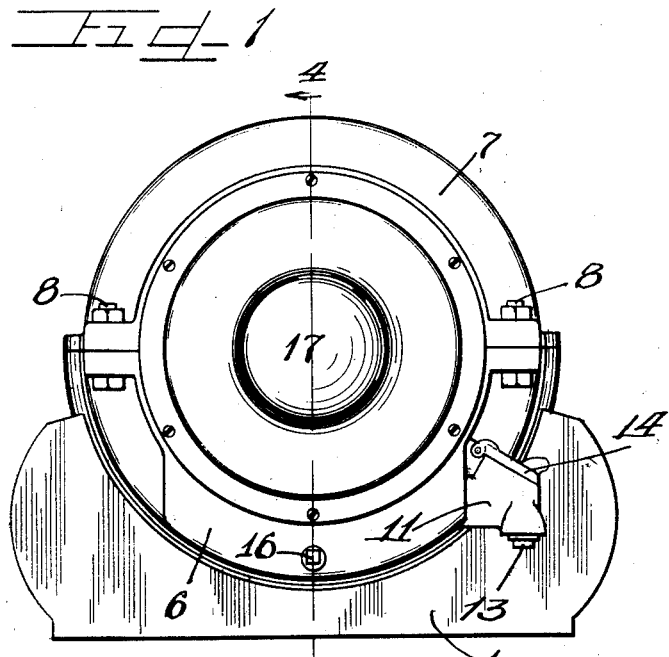
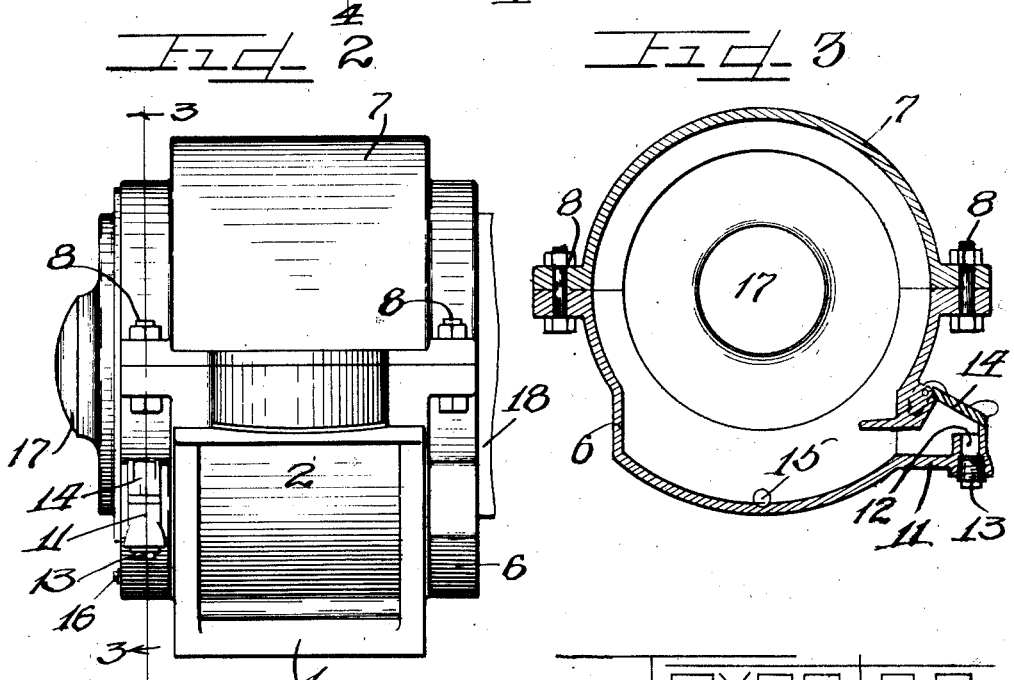

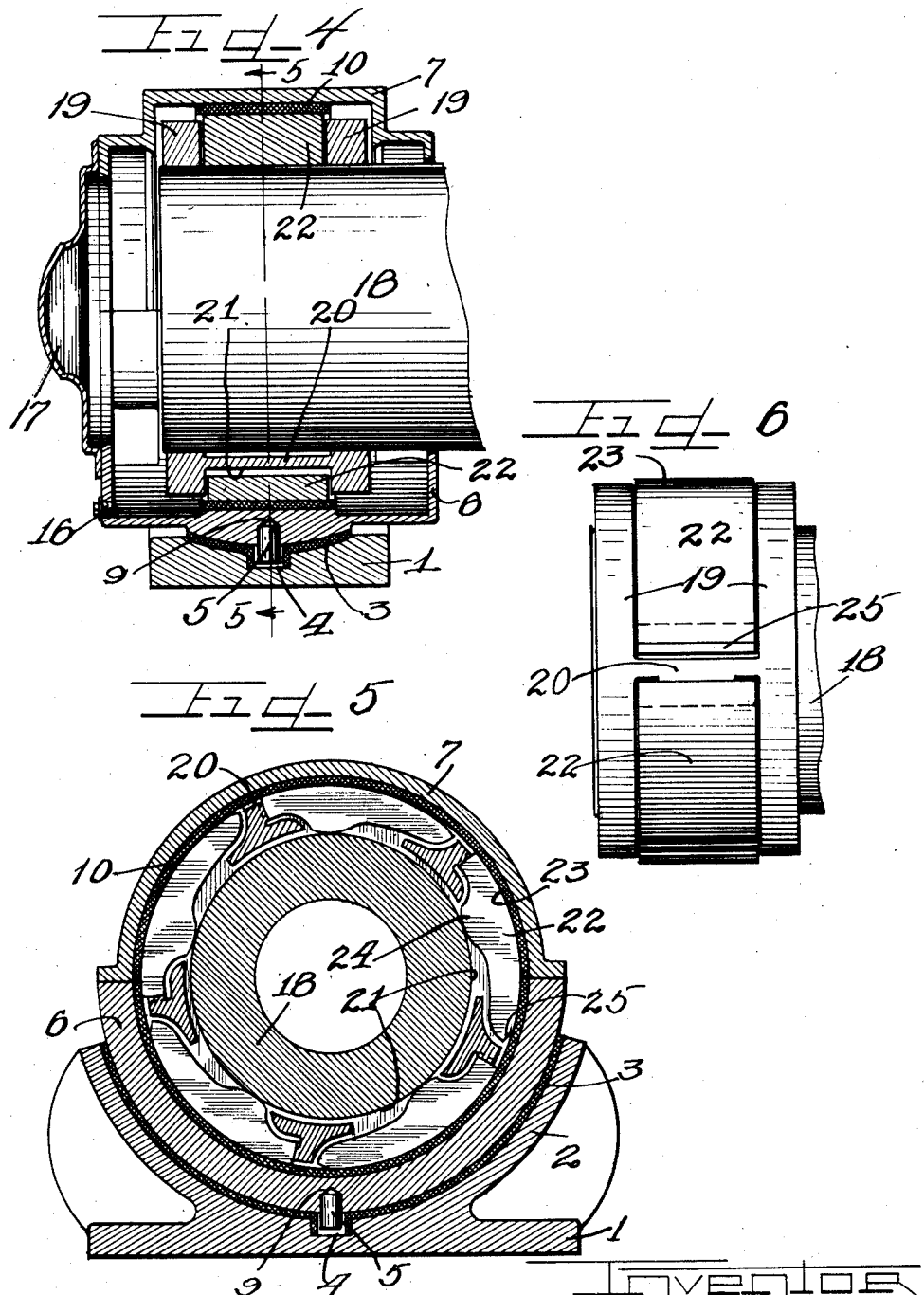

Patented Aug. 21, 1928.

1,681,388

UNITED STATES PATENT OFFICE.

EARL ELWIN BERRY, OF BELOIT, WISCONSIN, ASSIGNOR TO BELOIT IRON WORKS, A CORPORATION OF WISCONSIN.

SELF OILING AND ALIGNING BEARING.

Application filed April 10, 1924. Serial No. 705,428.

This invention relates to an improved self-aligning and self-oiling bearing adapted to provide a means for distributing the load over a large surface of the bearing by the use of rocker pads which are so arranged around the journal that a plurality of said pads take the entire load from the journal at all times.

It is an object of this invention to provide a bearing wherein pads are pivotally supported around the journal and have the outer curvature the same as the curvature of the bearing itself.

It is also an object of the invention to provide a bearing having a journal from which the load is taken by means of arc shaped pads disposed circumferentially around the journal and shaped to have a rocking or pivoted contact with said journal.

It is a further object of the invention to provide a bearing having pads disposed between the journal and the bearing housing and made so that the actual center of the journal is slightly eccentric with the center of the bearing depending upon the direction of the load on the journal.

It is furthermore an object of this invention to provide a bearing having a series of circumferential pads and wherein the oil level is higher than the rubbing surface between the pads and the bearing, so that the oil will flow into the crevices and be carried around the bearing to thoroughly lubricate the surface overcoming centrifugal action which has a tendency to keep the pads against the journal when they are positioned opposite to the load to lubricate both the surface of the pads and the bearing before the pads again enter into their load carrying positions.

It is an important object of this invention to provide a bearing of improved and simplified construction wherein revolving rocker pads carried by the journal contact the bearing surface so that the load is distributed over an increased area to reduce the bearing pressure per square inch and thereby act to preserve the oil filament between the bearing and the pads.

Other and further important objects of this invention will be apparent from the disclosures in the specification and accompanying drawings.

This invention (in a preferred form) is illustrated in the drawings and hereinafter more fully described.

On the drawings:

Figure 1 is an end elevation of an improved bearing embodying the principles of this invention.

Figure 2 is a side view thereof.

Figure 3 is a section taken on line 3—3 of Figure 2.

Figure 4 is a vertical section taken on line 4—4 of Figure 1 with parts in elevation.

Figure 5 is a transverse section taken on line 5—5 of Figure 4.

Figure 6 is an elevation of the pads and cage on the journal removed from the bearing housing.

As shown on the drawings:

The reference numeral 1 indicates a base having integrally formed thereon a seat or socket 2 provided with a bearing lining 3. The spherical seat 2 is formed with a recess 4 into which a pin 5 projects. Seated in the seat 2 upon the lining 3 is a bearing housing comprising a lower bearing section 6 and an upper bearing section or cup 7 secured in place on the lower bearing section by bolts 8. The pin 5 projects up into a recess 9 in the housing lower bearing section 6, thereby acting to hold said lower bearing section 6 against rotation in the base seat 2 but permitting the lower bearing section 6 to align itself. The bearing housing is provided with a bearing lining 10 of brass or any other suitable material. The lower bearing section 6 has formed thereon a spout or oil filling box 11, the bottom of which has an overflow tube 12 therein, affording an outlet for surplus oil. The end of the tube 12 is closed by a plug 13. A lid 14 is hinged upon the lower bearing section 6 and covers the oil spout 11. The lower bearing section 6 is also provided with a drain opening 15 which is closed by means of a plug 16. An end closure plate or cap 17 is fastened to one end of the bearing housing by machine screws or other suitable means in cases where the journal 18 does not extend through the bearing.

Fastened to and revolving with the journal 18 within the bearing housing is a cage or spider comprising a pair of rings 19 integrally connected by cross bars 20 having a cross section shaped as illustrated in Figure 5 or similar thereto. The cage rings 19 and the cross bars 20 form pockets 21, in each of which is positioned a shoe or pad 22 having a relatively large curved arcuate bearing surface 23 of a curvature similar to the curvature of the interior of the bearing housing. Each of the pads 22 is also provided with a rocker or heel 24 which rests against the surface of the journal to afford a pivot about which the pad may move. Each pad 22 is provided with a slight bevel 25 which has a tendency to drive a wedge shaped film of oil between the pad and the bearing housing lining 10.

Rotation of the journal 18 takes place in a clockwise direction looking at Figure 5 and causes rotation of the cage 19—20 and the pads 22. The load is distributed over a large area of the bearing, due to the fact that the outside curvature of the pads 22 is exactly the same as the curvature of the inner surface of the bearing. One or more of the pads act to take the entire load from the journal. Inasmuch as the oil level is higher than the rubbing surface between the pads and the bearing housing, the oil will flow into the spaces between the journal and the bearing and be carried around the bearing thereby thoroughly lubricating the bearing surfaces and acting to overcome centrifugal action that would tend to keep the pads against the bearing surface 23 when in a position opposite to the load. The surfaces of the pads and the bearing are thus completely lubricated before the pads enter again into their load carrying positions. The beveled portions 25 of the pads help to cause the oil film to pass between the pads and the bearing surface of the housing lining 23. The bearing is self-oiling and self-aligning and the load on this journal is distributed over substantially two-fifths of the bearing surface thereby greatly reducing the bearing pressure per square inch.

It will of course be understood that the number and shape of the pads may be changed if desired. I am also aware that many other changes in construction may be varied through a wide range without departing from the principles of this invention, and I therefore do not purpose limiting the patent granted otherwise than necessitated by the prior art.

I claim as my invention:

1. A bearing comprising a base, a housing seated therein, means for holding the housing from rotating in said base, a journal projecting into the housing, a cage secured on the journal within said housing, and a plurality of pads in said cage in contact with said journal and housing.

2. A bearing comprising a base having a seat formed thereon, a housing seated in said seat, a pin projecting into said housing and into said seat to hold the housing against rotation, a journal in said housing, a cage secured on said journal within said housing, said cage having pockets formed therein, curved pads in said cage pockets contacting said housing, and heels formed on said pads and contacting said journal.

3. In a bearing, the combination with a journal, a cage secured thereon, and a plurality of pads freely movable in said cage formed to have a rocking contact with the journal.

4. A bearing comprising a base, a seat formed thereon, a bearing lining in said seat, a recess formed in said seat, a pin projecting into said recess, a split housing seated in said seat upon said bearing lining and having a recess into which said pin projects to hold the split housing against rotation, a bearing lining in said housing, a journal projecting into the housing, a cage secured on the journal and rotatable therewith, and a plurality of pads in said cage having pivotal contact with the journal and frictional contact with the housing lining.

5. A bearing comprising a base, a seat formed thereon, a bearing housing in said seat, means for holding the housing from rotating in said seat, an oil spout formed on said housing, an overflow formed in said spout, a journal in the housing, a cage on said journal rotatable therewith, and pads in said cage having pivotal contact with the journal and frictional contact with said bearing housing.

6. The combination with a journal and a bearing, of curved pads between the journal and bearing, said pads being beveled at one end, and heels integrally formed on said pads for rocking contact with the journal.

7. In combination with a journal, a bearing seat, a cage secured to said journal and pads loosely held in said cage, said pads having rocker portions adapted to contact said journal and arcuate bearing surfaces adapted to contact said bearing seat.

8. In a bearing, the combination with a journal and a bearing housing, of a plurality of pads adapted to revolve with said journal, a portion of said pads having rocking contact with said journal and another portion having bearing contact with said housing.

9. In a bearing, the combination with a journal and a bearing housing, of means secured to said journal and forming pockets therewith, and bearing members loosely retained in said pockets and adapted to bear against said bearing housing, said members having heel portions in rocking contact with said journal whereby said members are free to rock about said journal to allow oil to be forced between the coacting surfaces of said members and said bearing housing.

In testimony whereof I have hereunto subscribed my name.

EARL ELWIN BERRY.